(12) United States Patent
Koh et al.

(10) Patent No.: US 9,769,402 B2
(45) Date of Patent: Sep. 19, 2017

(54) IMAGE SENSOR FOR REDUCING HORIZONTAL NOISE AND METHOD OF DRIVING THE SAME

(71) Applicant: SAMSUNG ELECTRONICS CO., LTD., Suwon-si (KR)

(72) Inventors: Kyoung-Min Koh, Hwaseong-si (KR); Kwang-Hyun Lee, Seongnam-si (KR); Ju-Ha Kim, Yongin-si (KR); Han Yang, Seoul (KR); Jae-Cheol Yun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 373 days.

(21) Appl. No.: 14/446,417

(22) Filed: Jul. 30, 2014

(65) Prior Publication Data

US 2015/0034803 A1 Feb. 5, 2015

(30) Foreign Application Priority Data

Jul. 30, 2013 (KR) .................. 10-2013-0090298

(51) Int. Cl.
*H04N 5/361* (2011.01)

(52) U.S. Cl.
CPC .................. *H04N 5/361* (2013.01)

(58) Field of Classification Search
USPC .... 250/208.1, 214 R, 214 C, 214 DC, 214.1; 348/272–283, 294–324, 332, 333.08, 348/335–338; 257/291–294, 414, 257/431–466; 438/57, 59, 60–98, 144
See application file for complete search history.

(56) References Cited

U.S. PATENT DOCUMENTS

| | | | |
|---|---|---|---|
| 7,355,640 B2 | 4/2008 | Takahashi et al. | |
| 7,518,647 B2 | 4/2009 | Kim et al. | |
| 7,567,277 B2 | 7/2009 | Inaba et al. | |
| 7,623,162 B2 | 11/2009 | Inaba | |
| 7,760,258 B2* | 7/2010 | Huang | H04N 5/2176 348/241 |
| 7,830,423 B2 | 11/2010 | Suzuki et al. | |
| 8,098,307 B2 | 1/2012 | Funakoshi | |
| 9,252,184 B2* | 2/2016 | Amikawa | H01L 27/14621 |
| 2006/0114342 A1* | 6/2006 | Egawa | H04N 5/361 348/241 |
| 2010/0039538 A1 | 2/2010 | Ikedo | |
| 2010/0128148 A1 | 5/2010 | Yamauchi | |
| 2011/0037882 A1 | 2/2011 | Kukita et al. | |
| 2011/0317055 A1 | 12/2011 | Nozaki et al. | |
| 2012/0262622 A1 | 10/2012 | Kim et al. | |
| 2012/0327280 A1* | 12/2012 | Ishii | H04N 5/374 348/301 |

FOREIGN PATENT DOCUMENTS

KR 10-2011-0064215 A 6/2011

* cited by examiner

*Primary Examiner* — Seung C Sohn
(74) *Attorney, Agent, or Firm* — Sughrue Mion, PLLC

(57) ABSTRACT

Provided are an image sensor and a method of driving the same. The image sensor includes n optical black pixels which are arranged in the same horizontal line; and m comparators which are matched with the n optical black pixels, wherein n is a natural number greater than or equal to two, and m is a natural number greater than n.

14 Claims, 19 Drawing Sheets

IMAGE SENSOR FOR REDUCING HORIZONTAL NOISE AND METHOD OF DRIVING THE SAME

CROSS-REFERENCE TO RELATED APPLICATION

This application claims priority from Korean Patent Application No. 10-2013-0090298 filed on Jul. 30, 2013 in the Korean Intellectual Property Office, the disclosure of which is incorporated herein by reference in its entirety.

BACKGROUND

Exemplary embodiments relate to an image sensor and a method of driving the same.

Related art image sensors convert an optical image into an electrical signal. With recent advancements in computer and communication industries, the demand for image sensors with enhanced performance is increasing in various fields such as digital cameras, camcorders, personal communication systems, game devices, security cameras, micro-cameras for medical use, and robots.

Image correction of an image sensor is disclosed in U.S. Pat. No. 7,830,423.

SUMMARY

Exemplary embodiments may provide an image sensor having reduced horizontal noise.

Exemplary embodiments may also provide a method of driving an image sensor, the method capable of reducing horizontal noise of the image sensor.

However, aspects of the exemplary embodiments are not restricted to the one set forth herein. The above and other aspects of the exemplary embodiments will become more apparent to one of ordinary skill in the art to which the exemplary embodiments pertains by referencing the detailed description given below.

According to an aspect of the exemplary embodiments, there is provided an image sensor including: n optical black pixels which are arranged in the same horizontal line; and m comparators which are matched with the n optical black pixels, wherein n is a natural number greater than or equal to 2, and m is a natural number greater than n.

According to another aspect of the exemplary embodiments, there is provided an image sensor including: an optical black region, a dummy region, and an active pixel array which are sequentially arranged in a first direction; and a first sampling region, a second sampling region, and a third sampling region which are sequentially arranged in the first direction, wherein the optical black region and the first sampling region are disposed adjacent to each other in a second direction, the dummy region and the second sampling region are disposed adjacent to each other in the second direction, the active pixel array and the third sampling region are disposed adjacent to each other in the second direction, and a plurality of optical black signals output from the optical black region are provided to the first sampling region and the second sampling region.

According to another aspect of the exemplary embodiments, there is provided an image sensor including: a plurality of optical black pixels which are arranged in the same horizontal line and which output a plurality of respective optical black signals; a connecting structure which is configured to merge the optical black signals into one integrated signal; and a plurality of comparators, wherein each of the comparators are configured to receive the one integrated signal and compare the one integrated signal with a reference signal.

According to another aspect of the exemplary embodiments, there is provided a method of driving an image sensor. The method includes: providing an image sensor which includes a plurality of optical black pixels and a plurality of comparators; outputting a plurality of respective optical black signals from the optical black pixels; merging the optical black signals into one integrated signal; and receiving the one integrated signal and comparing the one integrated signal with a reference signal using each of the comparators.

According to yet another aspect of the exemplary embodiments, there is provided a method of driving an image sensor. The method includes: arranging a plurality of optical black pixels in the same horizontal line; arranging at least one a plurality of comparators in the same vertical lines as the optical black pixels; outputting a plurality of respective optical black signals from the optical black pixels; merging the optical black signals into one integrated signal; and generating a plurality of comparison results by comparing the one integrated signal with a reference signal using the plurality of comparators.

BRIEF DESCRIPTION OF THE DRAWINGS

The above and other aspects and features of the exemplary embodiments will become more apparent by describing in detail exemplary embodiments thereof with reference to the attached drawings, in which.

DETAILED DESCRIPTION OF THE EXEMPLARY EMBODIMENTS

Figure 1:
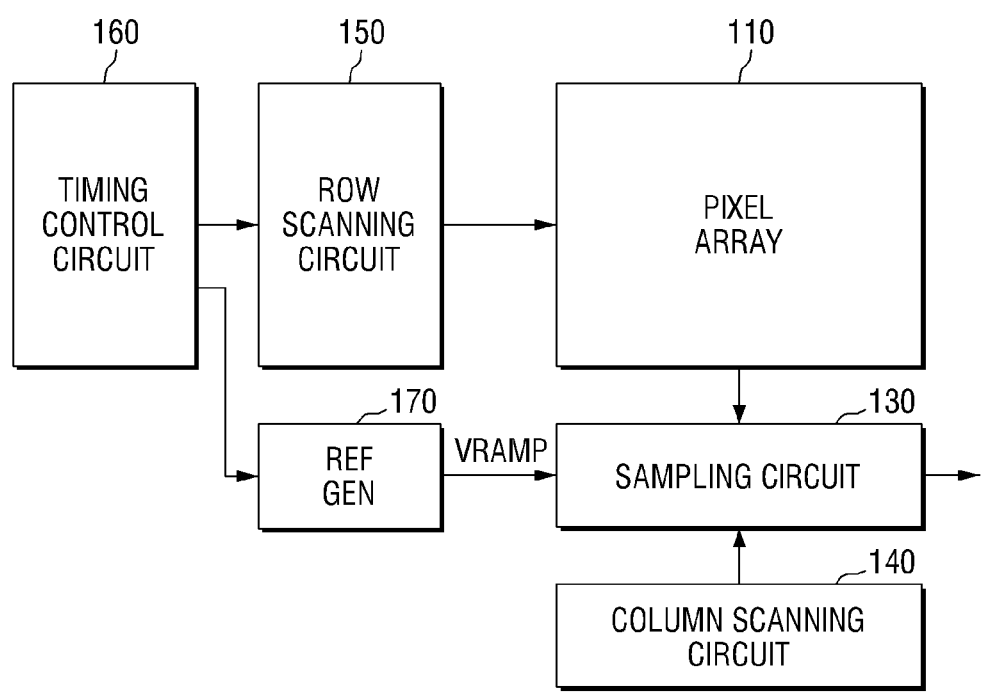
FIG. 1 is a block diagram of an image sensor according to embodiments.

Advantages and features of the exemplary embodiments and methods of accomplishing the same may be understood more readily by reference to the following detailed description of preferred embodiments and the accompanying drawings. The exemplary embodiments may, however, be embodied in many different forms and should not be construed as being limited to the embodiments set forth herein. Rather, these embodiments are provided so that this disclosure will be thorough and complete and will fully convey the concept of the exemplary embodiments to those skilled in the art, and the exemplary embodiments will only be defined by the appended claims. In the drawings, the thickness of layers and regions are exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The use of the terms "a" and "an" and "the" and similar references in the context of describing the exemplary embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the exemplary embodiments.

The exemplary embodiments will be described with reference to perspective views, cross-sectional views, and/or plan views, in which preferred embodiments are shown. Thus, the profile of an exemplary view may be modified according to manufacturing techniques and/or allowances. That is, the embodiments are not intended to limit the scope of the exemplary embodiments but cover all changes and modifications that can be caused due to a change in manufacturing process. Thus, regions shown in the drawings are illustrated in schematic form and the shapes of the regions are presented simply by way of illustration and not as a limitation.

Unless defined otherwise, all technical and scientific terms used herein have the same meaning as commonly understood by one of ordinary skill in the art to which the exemplary embodiments belong. It is noted that the use of any and all examples, or exemplary terms provided herein is intended merely to better illuminate the exemplary embodiments and is not a limitation on the scope of the exemplary embodiments unless otherwise specified. Further, unless defined otherwise, all terms defined in generally used dictionaries may not be overly interpreted.

Figure 2:
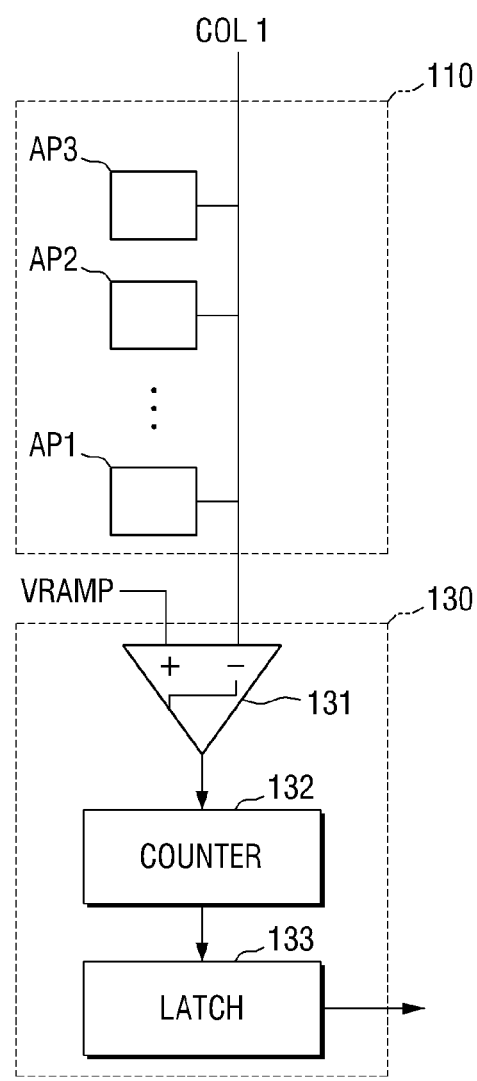
FIG. 2 is a circuit diagram of a pixel array and a sampling circuit shown in FIG. 1.

FIG. 1 is a block diagram of an image sensor 1 according to embodiments. FIG. 2 is a circuit diagram of a pixel array 110 and a sampling circuit 130 shown in FIG. 1.

Referring to FIGS. 1 and 2, the image sensor 1 according to the embodiments includes the pixel array 110, a timing control circuit 160, a row scanning circuit 150, a column scanning circuit 140, a reference signal generator 170, and the sampling circuit 130.

The pixel array 110 includes an active pixel array (APS) 111, a plurality of optical black regions 112, 113, 115, a dummy region 210, 220, 230, 240, 119, etc. (see also FIG. 4). The pixel array 110 includes a plurality of pixels, and the pixels may be arranged in a matrix.

Each of the pixels may have a three-transistor structure, a four-transistor structure, a five-transistor structure, a six-transistor structure, etc., according to the number of transistors included in a signal generating circuit. A row selection line may be installed in each row of the pixel array 110, and a column selection line may be installed in each column of the pixel array 110. In an example, if the pixel array 110 includes M×N pixels (where M and N are integers of two or more), M row selection lines and N column selection lines will be installed in the pixel array 110.

Row addressing and row scanning of the pixel array 110 may be controlled by the row scanning circuit 150 through the row selection lines, and column addressing and column scanning of the pixel array 110 may be controlled by the column scanning circuit 140 through the column selection lines.

If the image sensor 1 employs Bayer pattern technology, pixels in the active pixel array 110 may be arranged to receive red (R) light, green (G) light, and blue (B) light, respectively. Alternatively, the pixels may be arranged to receive magenta (Mg) light, yellow (Y) light, cyan (Cy) light, and/or white (W) light, respectively.

The reference signal generator 170 generates a reference signal VRAMP and provides the reference signal VRAMP to the sampling circuit 130. The reference signal VRAMP may be in the form of a lamp.

The sampling circuit 130 includes a plurality of analog-to-digital converters (ADCs), each including a comparator 131, a counter 132, and a latch 133.

The sampling circuit 130 may perform one correlated double sampling (CDS) operation and an analog-to-digital conversion operation or may perform dual CDS operations and an analog-to-digital conversion operation. The sampling circuit 130 may be controlled by the timing control circuit 160. The operations of the ADCs may be performed whenever the row scanning circuit 150 selects a row selection line of the pixel array 110, i.e., in each row scan period.

The row scanning circuit 150 may control the row addressing and row scanning of the pixel array 110 in response to control signals received from the timing control circuit 160. The row scanning circuit 150 transmits a signal for activating a corresponding row selection line to the pixel array 110 in order to select the corresponding row selection line from the row selection lines. The row scanning circuit 150 may include a row decoder which selects a row selection line in the pixel array 110 and a row driver which transmits a signal for activating the selected row selection line.

The column scanning circuit 140 may control the column addressing and column scanning of the pixel array 110 in response to control signals received from the timing control circuit 160. The column scanning circuit 140 may output a digital output signal output from the sampling circuit 130 to a digital signal processor (DSP), an image signal processor (ISP), or an external host.

For example, the column scanning circuit 140 may sequentially select the ADCs within the sampling circuit 130 by outputting a horizontal scan control signal to the sampling circuit 130. In an embodiment, the column scanning circuit 140 may include a column decoder which selects one of the ADCs and a column driver which induces an output of the selected ADC to a horizontal transmission line. The horizontal transmission line may have a bit width needed to output the digital output signal.

The timing control circuit 160 may control the sampling circuit 130, the column scanning circuit 140, and the row scanning circuit 150 and transmit control signals (such as a clock signal and a timing control signal) required for the operations of the sampling circuit 130, the column scanning circuit 140, and the row scanning circuit 150. The timing control circuit 160 may include a logic control circuit, a phase lock loop (PLL) circuit, a timing control circuit, a communication interface circuit, etc.

Figure 3:
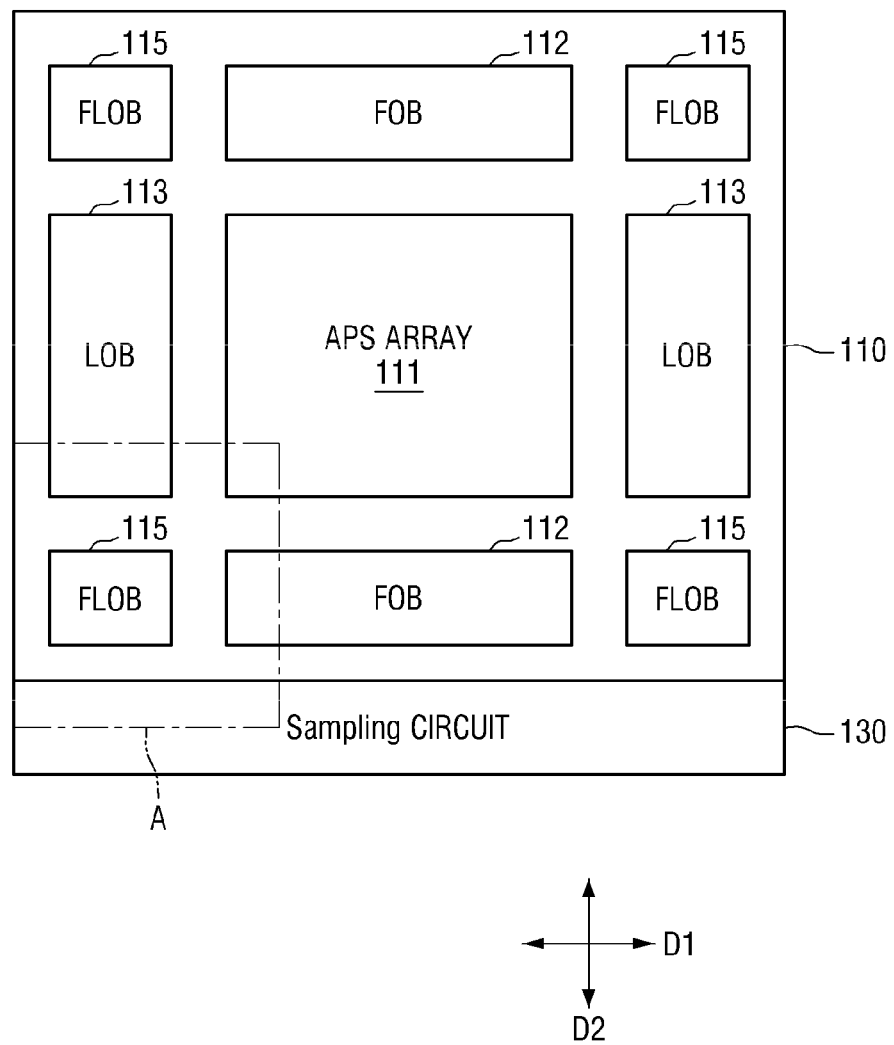
FIG. 3 is a layout diagram of the pixel array and the sampling circuit shown in FIG. 1.
Figure 4:
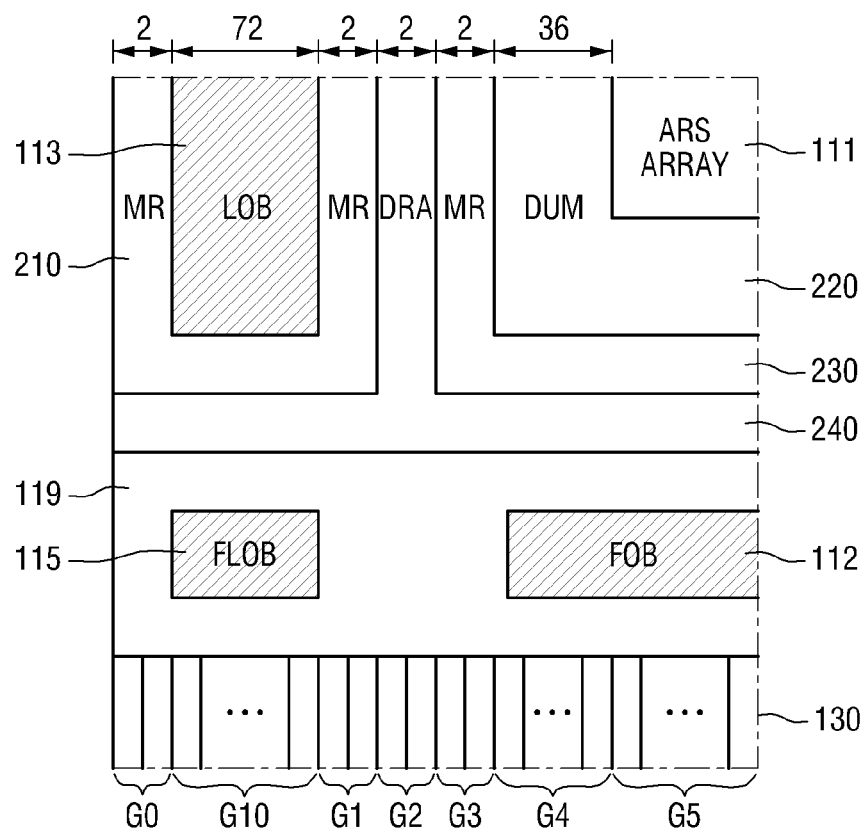
FIG. 4 is an enlarged diagram of a region A shown in FIG. 3.

FIG. 3 is a layout diagram of the pixel array 110 and the sampling circuit 130 shown in FIG. 1. FIG. 4 is an enlarged diagram of a region A shown in FIG. 3.

Referring to FIG. 3, the sampling circuit 130 is placed on a side (i.e., a lower side) of the pixel array 110.

The pixel array 110 includes the active pixel array 111, the optical black regions 112, 113, 115, etc.

The active pixel array 111 includes a plurality of active pixels. As will be described later with reference to FIGS. 12A through 12D, 13A and 13B, each of the active pixels includes a sensing device which outputs an electrical signal by sensing a physical quantity such as the intensity of light, the intensity of sound, temperature, mass, time, etc. One active pixel may include, e.g., three to five transistors and a photodiode. Alternatively, one active pixel may include a plurality of (e.g., two, four, etc.) photodiodes.

The optical black regions 112, 113, 115 may include various types of optical black regions. Frame optical black (FOB) regions 112 may be disposed in a second direction D2 of (e.g., above and below) the active pixel array 111. Line optical black (LOB) regions 113 may be disposed in a first direction D1 (e.g., on the left and right sides) of the active pixel array 111. Frame line optical block (FLOB) regions 115 may be disposed at corners of the active pixel array 111, i.e., at upper left, lower left, upper right and lower right corners of the active pixel array 111.

The FOB regions 112 are designed to compensate for an offset between all active pixels distributed in a frame. The LOB regions 113 are designed to compensate for an offset between lines (i.e., columns) of the active pixels. The FLOB 115 regions are designed to compensate for an offset between lines within the FOB regions 112.

Although not shown in the drawing, the optical block regions 112, 113, 115 may include a plurality of optical black pixels. The optical black pixels may have substantially the same shape as the active pixels, and each of the optical black pixels may further include a light-blocking layer (a metal layer) which blocks light. Alternatively, each of the optical black pixels may not have a photodiode, but the exemplary embodiments are not limited thereto.

Referring to FIG. 4, the dummy region 210, 220, 230, 240 is disposed between a LOB region 113 and the active pixel array 111. In addition, the dummy region 210, 240, 119 is disposed between the LOB region 113 and a FLOB region 115. Also, the dummy region 220, 230, 240, 119 is disposed between the active pixel array 111 and the FOB region 112. Further, the dummy region 119 is disposed between the FLOB region 115 and the FOB region 112.

As shown in the drawing, the LOB region 113, the dummy region 210, 220, 230, 240, 119, and the active pixel array 111 may be sequentially arranged in the first direction D1.

The dummy region 210, 220, 230, 240, 119 is used for various reasons and may include a plurality of pixels that are not used.

In particular, a drain region 240 extends along the first direction D1 to separate the LOB region 113 and the FLOB region 115, and separate the active pixel array 111 and the FOB region 112. In addition, the drain region 240 extends along the second direction D2 to separate the LOB region 113 and the active pixel array 111. The drain region 240 prevents electrons from flowing into the LOB region 113 and the FOB region 112, thereby reducing noise that may occur in the LOB region 113 and the FOB region 112. The drain region 240 includes drain pixels having substantially the same structure as the active pixels.

An edge region 220 may surround the active pixel array 111. In other words, the edge region 220 is disposed at a boundary of the active pixel array 111 and includes a plurality of edge pixels. The edge pixels may have substantially the same structure as the active pixels and are not used for securing stability and margins.

A first margin region 210 may surround the LOB region 113, and a second margin region 230 may surround the active pixel array 111. The first margin region 210 is provided to protect the LOB region 113, and the second margin region 230 is provided to protect the active pixel array 111. Each of the first margin region 210 and the second margin region 230 includes margin pixels having substantially the same structure as the active pixels. The margin pixels are not used for securing stability and margins.

A third margin region 119 may surround the FOB region 112 and the FLOB region 115.

As shown in the drawing, e.g., 72 optical black pixels may be arranged in the first direction D1 in the LOB region 113.

As an example, two pixels may be arranged in the first direction D1 in the first margin region 210, two pixels may be arranged in the first direction D1 in the drain region 240, two pixels may be arranged in the first direction D1 in the second margin region 230, and 36 pixels may be arranged in the first direction D1 in the edge region 220. In other words, each of the first margin region 210, the second margin region 230, and the drain region 240 may have a width corresponding to two pixels.

The number of pixels used in the above example is merely an example, and the scope of the exemplary embodiments is not limited to this example.

Consequently, the edge region 220 may be wider than the first margin region 210, the drain region 240, and the second margin region 230. A width of the edge region 220 may be smaller than a width of the LOB region 113.

The sampling circuit 130 may include a plurality of sampling regions. In particular, a first sampling region G10, a second sampling region G0 through G4, and a third sampling region G5 may be arranged in the first direction D1.

As shown in the drawing, the LOB region 113 and the first sampling region G10 may be disposed adjacent to each other in the second direction D2, the dummy region 210, 220, 230, 240 and the second sampling region G0 through G4 may be disposed adjacent to each other in the second direction D2, and the active pixel array 111 and the third sampling region G5 may be disposed adjacent to each other in the second direction D2.

Figure 5:
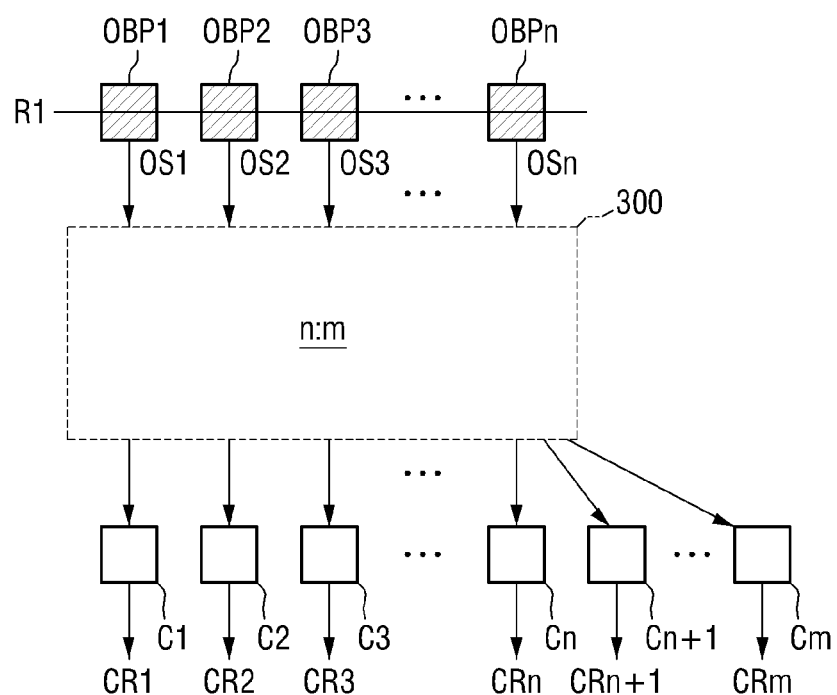
FIG. 5 is a conceptual diagram illustrating the relationship between a line optical black (LOB) region and the sampling circuit shown in FIGS. 3 and 4.

FIG. 5 is a conceptual diagram illustrating the relationship between the LOB region 113 and the sampling circuit 130 shown in FIGS. 3 and 4.

Referring to FIG. 5, n (where n is a natural number of two or more) optical black pixels OBP1 through OBPn are arranged in the same horizontal line R1 of the LOB region 113. The optical black pixels OBP1 through OBPn may output optical black signals OS1 through OSn, respectively. If the n optical black pixels OBP1 through OBPn are "arranged in a horizontal line," it means that the n optical black pixels OBP1 through OBPn overlap a virtual horizontal line.

The n optical black pixels OBP1 through OBPn are electrically connected to one row selection line. Therefore, the n optical black pixels OBP1 through OBPn may be simultaneously selected by a signal input to the row selection line.

In addition, m (where m is a natural number greater than n) comparators C1 through Cm are matched with the n optical black pixels OBP1 through OBPn.

If the comparators C1 through Cm are matched with the optical black pixels OBP1 through OBPn, it means that the optical black signals OS1 through OSn output from the optical black pixels OBP1 through OBPn are processed by the comparators C1 through Cm.

A connecting structure 300 is designed to match the n optical black pixels OBP1 through OBPn with the m (where m is a natural number greater than n) comparators C1 through Cm. In other words, the connecting structure 300 may be, but is not limited to, wiring. The form of the connecting structure 300 will be described with reference to FIGS. 6 through 8.

The noise of an image sensor may broadly be divided into two components: the noise of pixels themselves, and the noise of ADCs that process signals received from the pixels.

In the image sensor according to the embodiments, the optical black signals OS1 through OSn output from the n optical black pixels OBP1 through OBPn are processed not by n ADCs but by more than the n ADCs, e.g., m ADCs. A representative value of output signals of the m ADCs may be used to compensate for offsets of the active pixels. The representative value may be, but is not limited to, an average value or a weighted average value.

Since more ADCs than the number of the optical black pixels OBP1 through OBPn are used (as described above), the noise between the ADCs can be reduced. As a result, the noise of the whole image sensor can be reduced.

Referring back to FIG. 4, the optical black signals OS1 through OSn output from the optical black regions 112, 113, 115 are provided to the second sampling region G0 through G4 in addition to the first sampling region G10.

In the related art, the second sampling region G0 through G4 disposed adjacent to the dummy region 210, 220, 230, 240, 119 in the second direction D2 is not used. However, in the embodiments, the second sampling region G0 through G4 is used to process the optical black signals OS1 through OSn. Since the second sampling regions G0 through G4 not used in the related art is utilized in the embodiments, the noise between the ADCs can be reduced without increasing the size of the device (or manufacturing additional ADCs).

Optical black signals may be provided to a sampling region G4, which is adjacent to the edge region 220 in the second direction D2, among the second sampling region G0 through G4. In an example, 72 optical black signals output from 72 optical black pixels OBP1 through OBPn may be processed by 108 (=72+36) comparators (i.e., the sampling circuit 130).

Alternatively, among the second sampling region G0 through G4, a sampling region G2 disposed adjacent to the drain region 240 in the second direction D2 may be used.

Alternatively, among the second sampling region G0 through G4, sampling regions G0, G1, and G3 disposed adjacent to the first margin region 210 or the second margin region 230 in the second direction D2 may be used.

In summary, among the m comparators C1 through Cm, n comparators (e.g., C1 through Cn) may be arranged in the same vertical lines as the n optical black pixels OBP1 through OBPn, and (m-n) comparators (e.g., Cn+1 through Cm) may be arranged in different vertical lines from the n optical black pixels OBP1 through OBPn.

If the comparators C1 through Cm and the optical black pixels OBP1 through OBPn are "arranged in vertical lines," it means that they overlap virtual vertical lines.

At least some of the (m-n) comparators Cn+1 through Cm may be arranged in the same vertical lines as dummy pixels (pixels within the dummy region 210, 220, 230, 240, 119) disposed adjacent to the optical black pixels OBP1 through OBPn. The dummy pixels may include the margin pixels (pixels within the first and second margin regions 210 and 230), the drain pixels (pixels within the drain region 240), and/or the edge pixels (pixels within the edge region 220).

Consequently, the (m-n) comparators Cn+1 through Cm are arranged in the same vertical lines as the dummy pixels, but are electrically connected to the optical black pixels OBP1 through OBPn. Accordingly, the (m-n) comparators Cn+1 through Cm process the optical black signals OS1 through OSn of the optical black pixels OBP1 through OBPn.

Figure 6:
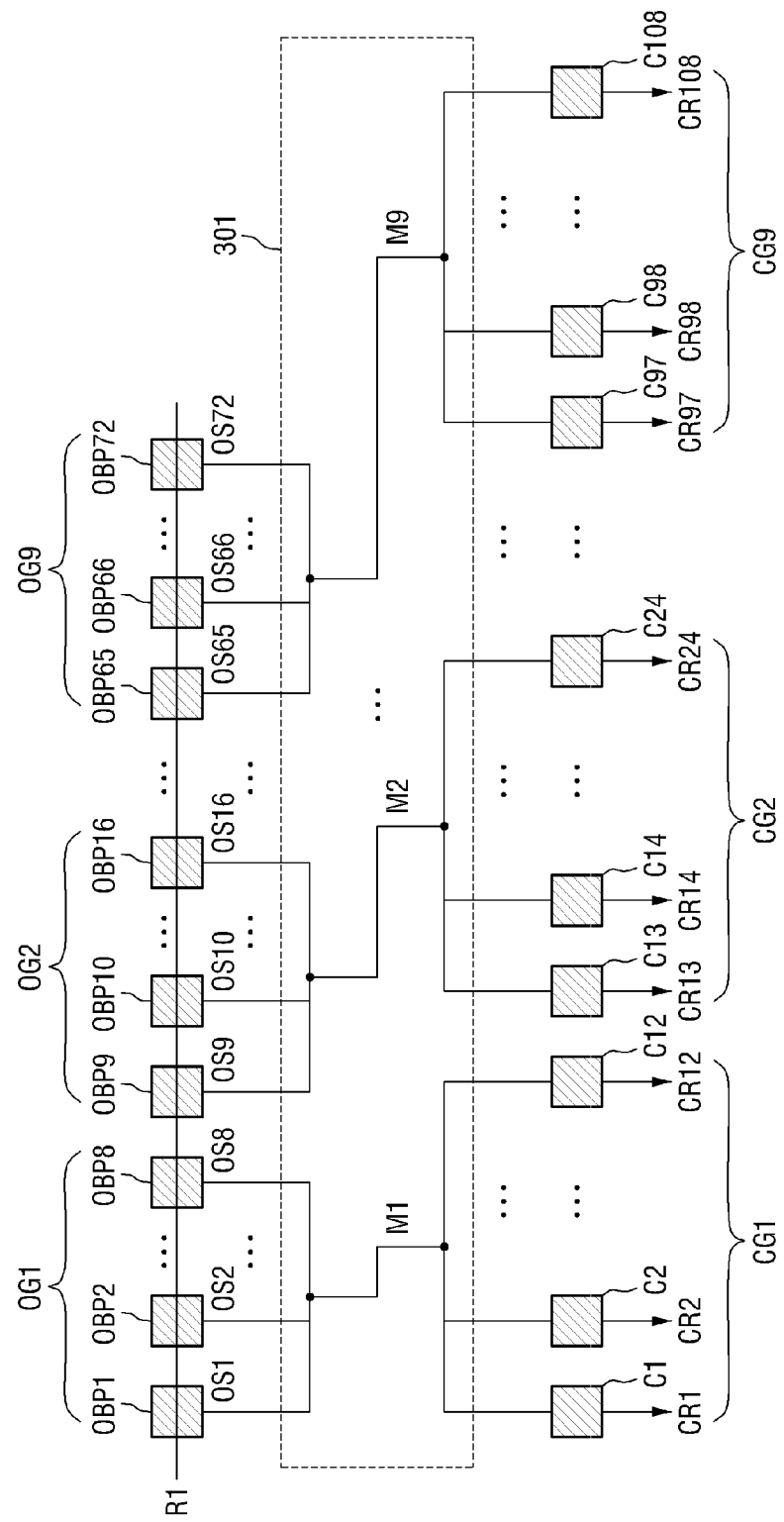
FIG. 6 is a conceptual diagram illustrating the exemplary relationship between the LOB region and the sampling circuit described in FIG. 5.

FIG. 6 is a conceptual diagram illustrating the exemplary relationship between the LOB region 113 and the sampling circuit 130 described in FIG. 5.

Referring to FIG. 6, the n optical black pixels OBP1 through OBPn may be divided into x (where x is a natural number of two or more) optical black groups, and the m comparators C1 through Cm may be divided into x comparator groups. The x optical black groups may be matched one-to-one with the x comparator groups.

In particular, e.g., 72 optical black pixels OBP1 through OBPn are divided into nine optical black groups OG1 through OG9. A first optical black group OG1 may include OBP1 through OBP8, a second optical black group OG2 may include OBP9 through OBP16, and a ninth optical black group OG9 may include OBP65 through OBP72.

108 comparators C1 through C108 are divided into nine comparator groups CG1 through CG9. A first comparator group CG1 may include C1 through C12, a second comparator group CG2 may include C13 through C24, and a ninth comparator group CG9 may include C97 through C108.

Optical black signals OS1 through OS8 output from the optical black pixels OBP1 through OBP8 of the first optical black group OG1 are merged into an integrated signal M1. The integrated signal M1 is provided to the comparators C1 through C12 of the first comparator group CG1. The comparators C1 through C12 compare the integrated signal M1 with the reference signal VRAMP and output comparison results CR1 through CR12.

Optical black signals OS9 through OS16 output from the optical black pixels OBP9 through OBP16 of the second optical black group OG2 are merged into an integrated signal M2. The integrated signal M2 is provided to the comparators C13 through C24 of the second comparator group CG2. The comparators C13 through C24 compare the integrated signal M2 with the reference signal VRAMP and output comparison results CR13 through CR24.

Optical black signals OS65 through OS72 output from the optical black pixels OBP65 through OBP72 of the ninth optical black group OG9 are merged into an integrated signal M9. The integrated signal M9 is provided to the comparators C97 through C108 of the ninth comparator group CG9. The comparators C97 through C108 compare the integrated signal M9 with the reference signal VRAMP and output comparison results CR97 through CR108.

In summary, twelve comparators (e.g., C1 through C12) perform the same comparison operation. Therefore, the DSP may take the average of the comparison results CR1 through CR12 output from the twelve comparators C1 through C12, and use the average value. Hence, noise that may occur in the comparators C1 through C12 can be removed.

Figure 7:
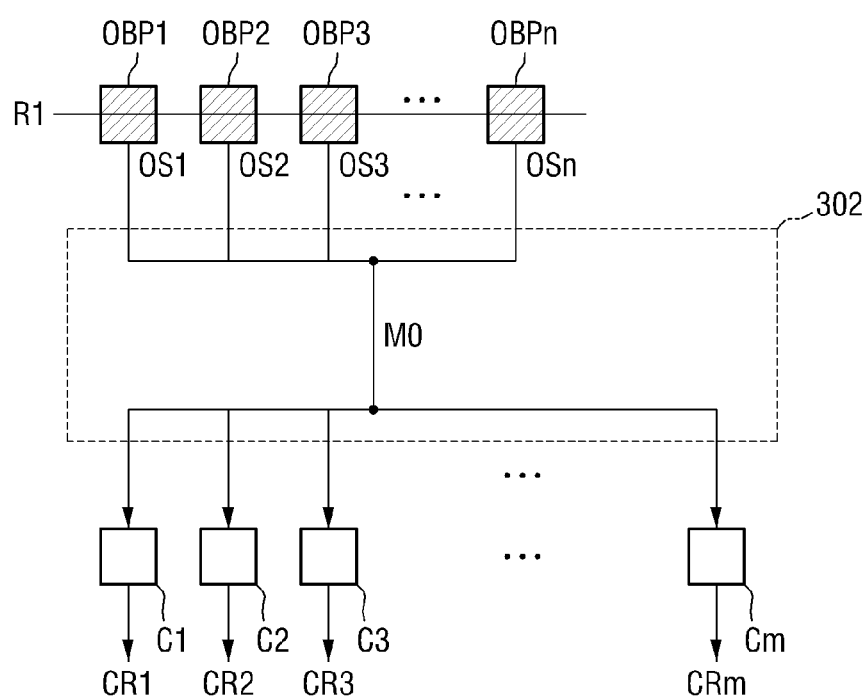
FIG. 7 is another conceptual diagram illustrating the exemplary relationship between the LOB region and the sampling circuit described in FIG. 5.

FIG. 7 is a conceptual diagram illustrating the exemplary relationship between the LOB region 113 and the sampling circuit 130 described in FIG. 5.

Referring to FIG. 7, the n optical black signals OS1 through OSn output from the n optical black pixels OBP1 through OBPn are merged into one integrated signal M0, and the integrated signal M0 is provided to the m comparators C1 through Cm. The comparators C1 through Cm compare the integrated signal M0 with the reference signal VRAMP and output comparison results CR1 through CRm. The average of the comparison results CR1 through CRm can be used to remove noise that may occur in the comparators C1 through C12.

Figure 8:
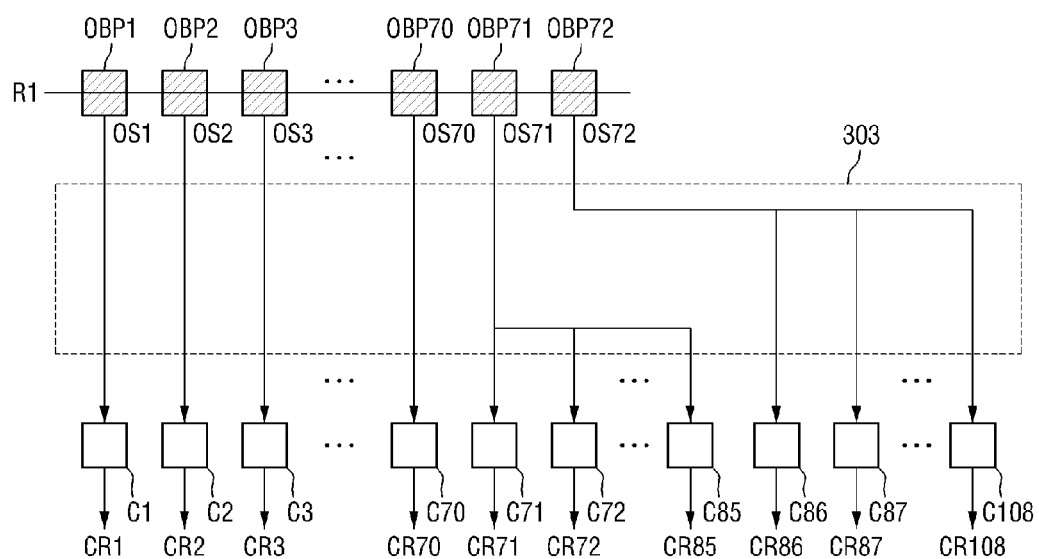
FIG. 8 is another conceptual diagram illustrating the exemplary relationship between the LOB region and the sampling circuit described in FIG. 5.

FIG. 8 is a conceptual diagram illustrating the exemplary relationship between the LOB region 113 and the sampling circuit 130 described in FIG. 5.

Referring to FIG. 8, y (where y is a natural number smaller than n) optical black pixels among the n optical black pixels OBP1 through OBPn are matched one-to-one with y comparators, and (n-y) optical black pixels among the n optical black pixels OBP1 through OBPn are matched one-to-many with (m-y) comparators.

In particular, e.g., 70 optical black pixels OBP1 through OBP70 among 72 optical black pixels OBP1 through OBP72 may be matched one-to-one with 70 comparators C1 through C70, and the other two optical black pixels OBP71 and OBP72 may be matched one-to-many with the remaining comparators C72 through C108. As shown in FIG. 8, OBP71 is matched with C71 through C85, and OBP72 is matched with C86 through C108. However, this configuration is merely an example.

Figure 9:
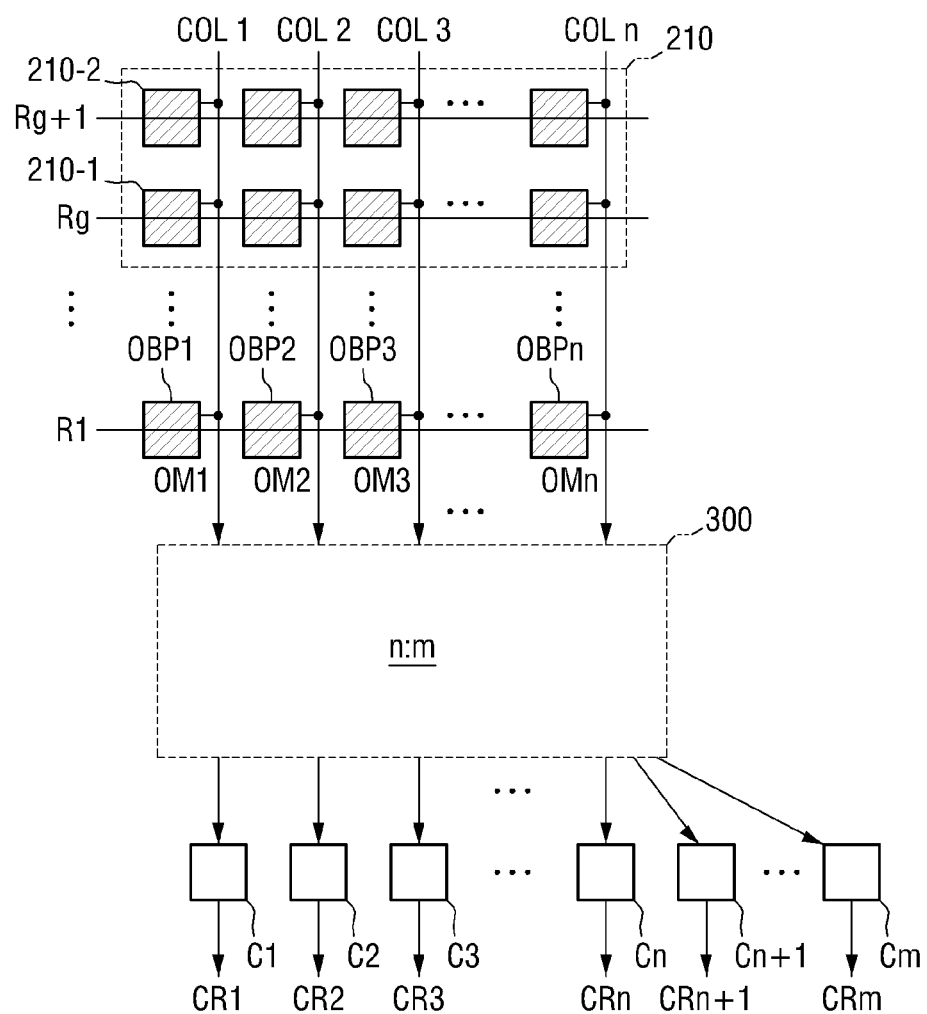
FIG. 9 is another conceptual diagram illustrating the exemplary relationship between the LOB region and the sampling circuit described in FIG. 5.

FIG. 9 is a conceptual diagram illustrating the exemplary relationship between the LOB region 113 and the sampling circuit 130 described in FIG. 5.

Referring to FIG. 9, one or more dummy pixels 210_1 and 210_2 are disposed in the same vertical line as a first optical black pixel OBP1 among the n optical black pixels OBP1 through OBPn.

An output value of the first optical black pixel OBP1 and output values of the dummy pixels 210_1 through 210_2 are merged into an integrated signal OM1. The integrated signal OM1 may be generated by providing the output value of the first optical black pixel OBP1 and the output values of the dummy pixels 210_1 and 210_2 to the same column selection line (e.g., COL 1). The integrated signal OM1 is an average value of the output value of the first optical black pixel OBP1 and the output values of the dummy pixels 210_1 and 210_2. A method using such an average value may be referred to as a pixel level average (PLA) method. The PLA method can reduce noise that may occur between pixels.

In the above method, n integrated signals OM1 through OMn are generated. The n integrated signals OM1 through OMn are provided to m comparators. The n integrated signals OM1 through OMn may be matched with the m comparators as described above with reference to FIGS. 3 through 8.

The dummy pixels 210_1 and 210_2 may be disposed in the dummy region 210, 220, 230, 240, 119 located between the LOB region 113 and the FLOB region 115. In an example, the dummy pixels 210_1 and 210_2 may be located in the margin regions 210 and 119.

Figure 10:
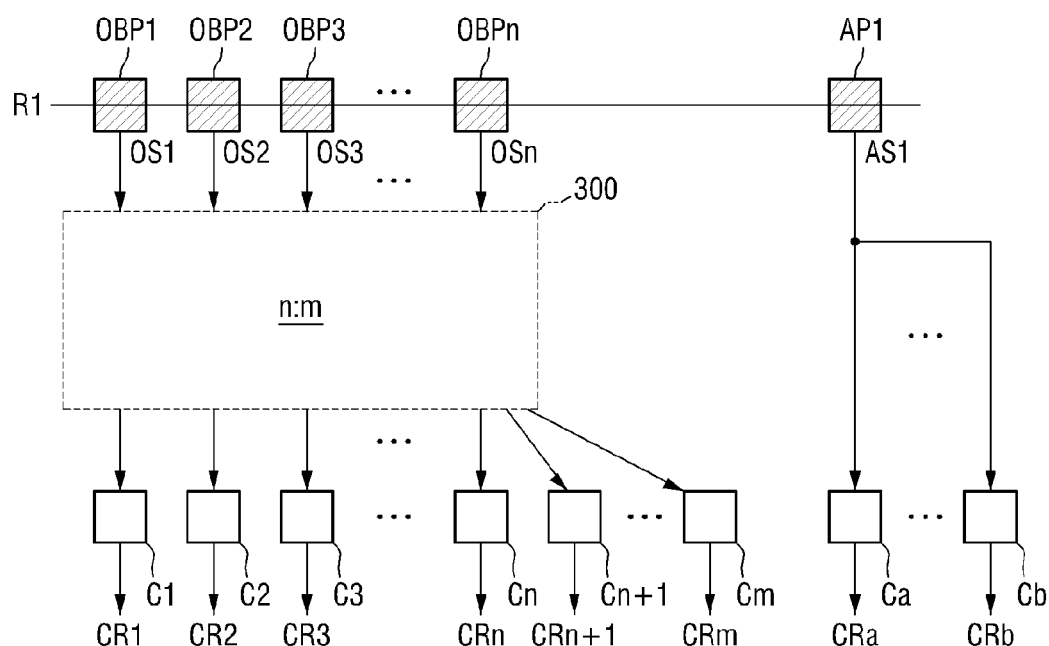
FIG. 10 is a conceptual diagram illustrating the exemplary relationship between an active pixel array and the sampling circuit.

FIG. 10 is a conceptual diagram illustrating the exemplary relationship between the active pixel array 111 and the sampling circuit 130.

Referring to FIG. 10, one active pixel AP1 may be matched with a plurality of comparators Ca through Cb in a similar way that the n optical black pixels OBP1 through OBPn are matched with the m comparators C1 through Cm. In other words, the active pixel AP1 disposed in the same horizontal line as the n optical black pixels OBP1 through OBPn may be matched one-to-many with the comparators Ca through Cb.

The comparators Ca through Cb may output CRa through CRb by comparing an output value AS1 of the active pixel AP1 with the reference signal VRAMP. In other words, the comparators Ca through Cb perform the same comparison operation.

Figure 11:
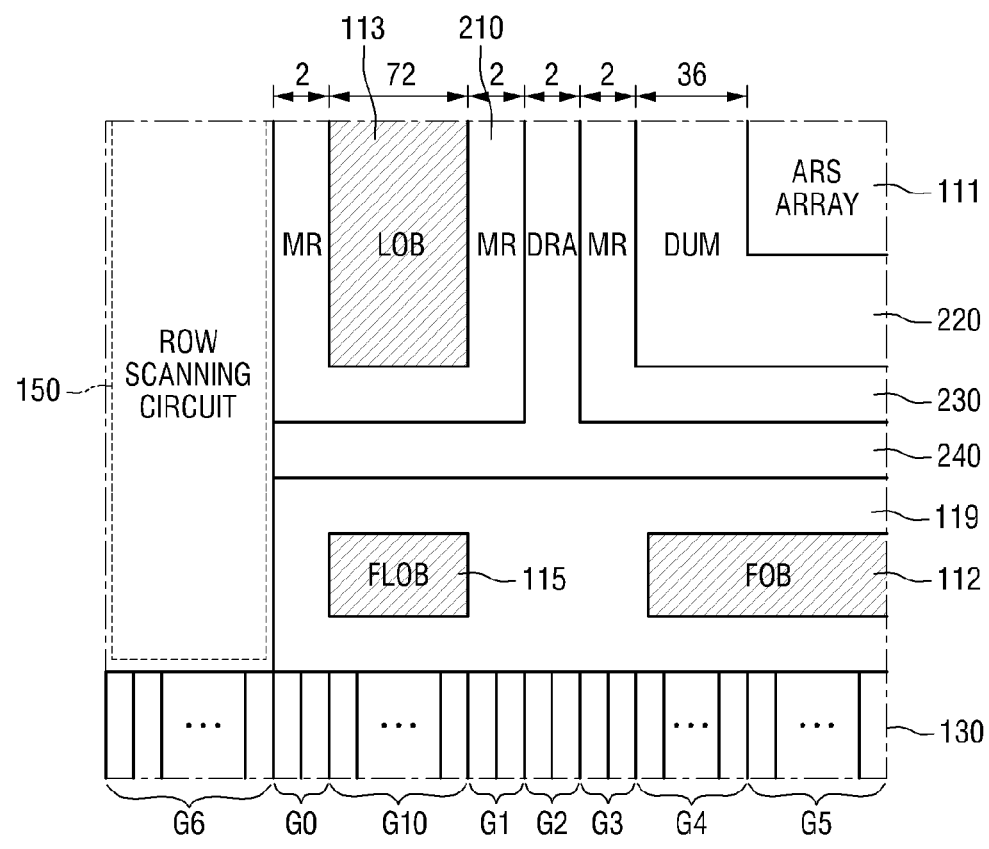
FIG. 11 is another layout diagram of the pixel array and the sampling circuit shown in FIG. 1.

FIG. 11 is another layout diagram of the pixel array 110 and the sampling circuit 130 shown in FIG. 1. For simplicity, differences with FIGS. 4 and 5 will mainly be described.

In FIGS. 4 and 5, the second sampling region G0 through G4 unused in the related art is used to process the optical black signals OS1 through OSn. Accordingly, noise between the ADCs can be reduced without increasing the size of device.

Referring to FIG. 11, a sampling circuit 130 may further include a fourth sampling region G6 which is disposed adjacent to a row scanning circuit 150 in a second direction D2 and is disposed adjacent to a first sampling region G10. The fourth sampling region G6 may be used to process optical black signals OS1 through OSn.

Since a second sampling region G0 through G4 is formed adjacent to the row scanning circuit 150, an increase in the size of the sampling circuit 130 can be minimized.

FIGS. 12A through 12D are circuit diagrams of examples of an active pixel included in the image sensor of FIG. 1.

Figure 12A:
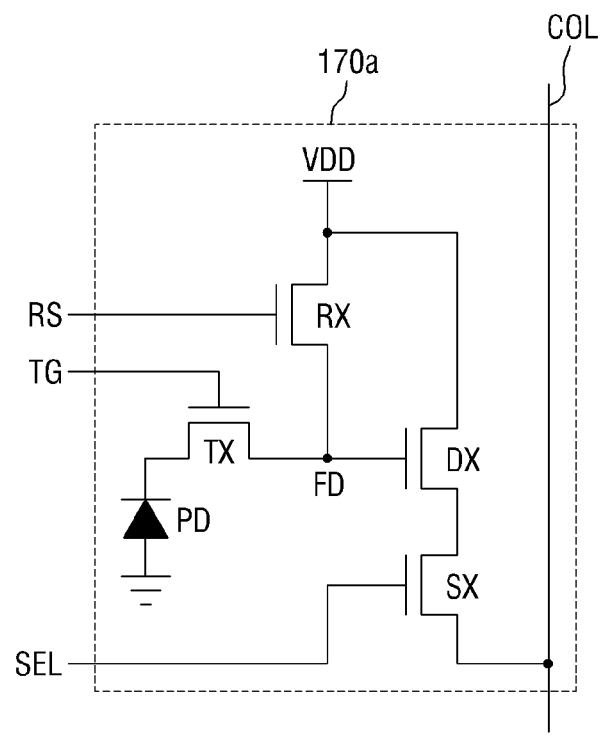
FIGS. 12A through 12D are circuit diagrams of examples of an active pixel included in the image sensor of FIG. 1.

Referring to FIG. 12A, an active pixel 170a has a four-transistor structure including one photodiode PD and four metal oxide semiconductor (MOS) transistors TX, RX, DX, SX. The active pixel 170a includes a photodiode (or photosensitive device) PD, a transfer transistor TX, a floating diffusion node FD, a reset transistor RX, a drive transistor DX, and a selection transistor SX.

Instead of the photodiode PD, a phototransistor, a photogate, a pinned photodiode (PPD), etc., can be used.

Figure 12B:
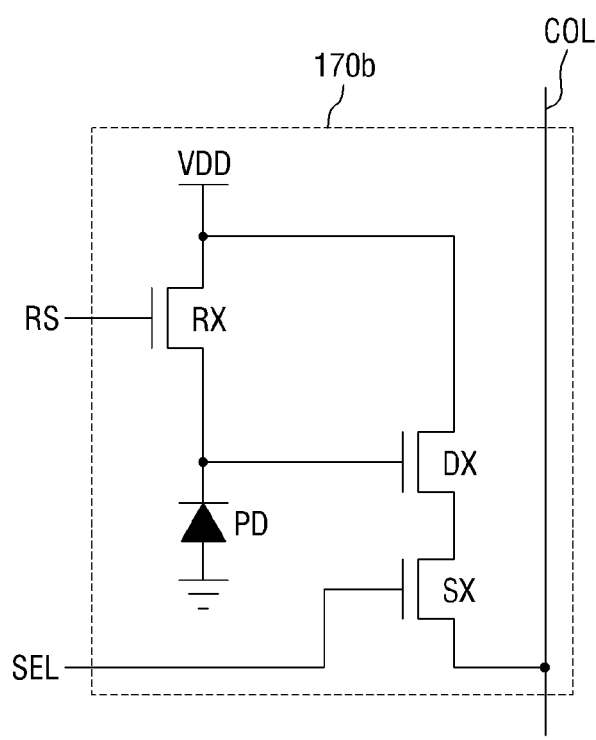

Referring to FIG. 12B, an active pixel 170b has a three-transistor structure including three MOS transistors RX, DX, SX. The active pixel 170b includes a photodiode PD, a reset transistor RX, a drive transistor DX (or a source follower transistor), and a selection transistor SX.

Figure 12C:
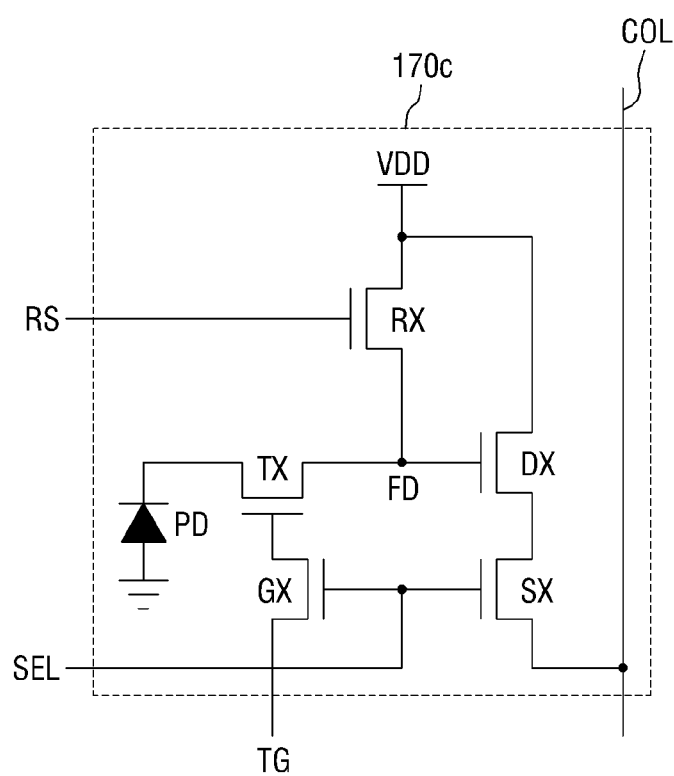

Referring to FIG. 12C, an active pixel 170c has a five-transistor structure including five MOS transistors RX, TX, GX, DX, SX. The active pixel 170c includes one more transistor GX, in addition to a photodiode PD, a transfer transistor TX, a reset transistor RX, a drive transistor DX (or a source follower transistor), and a selection transistor SX.

Figure 12D:
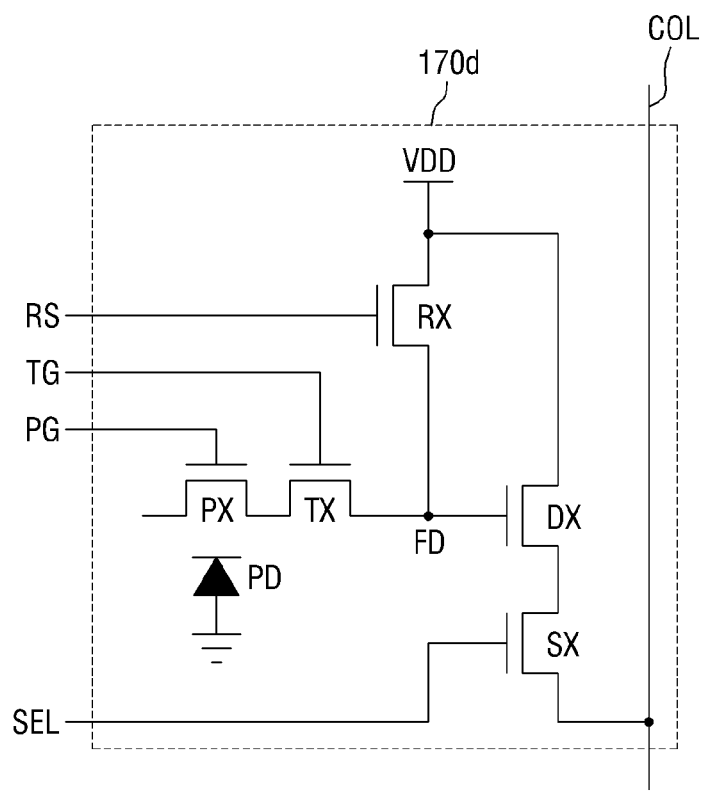

Referring to FIG. 12D, an active pixel 170d has a five-transistor structure including five MOS transistors RX, TX, PX, DX, SX. The active pixel 170d includes one more transistor PX in addition to a photodiode PD, a transfer transistor TX, a reset transistor RX, a drive transistor DX (or a source follower transistor), and a selection transistor SX.

As shown in FIGS. 12A through 12D, various types of active pixels may have an independent structure, and may share at least one element. For example, in the structure illustrated in FIG. 12A, two or four pixels may include only the photodiode PD and the transfer transistor TX independently, and share the other elements. The two or four pixels may operate independently through timing control.

Figure 13A:
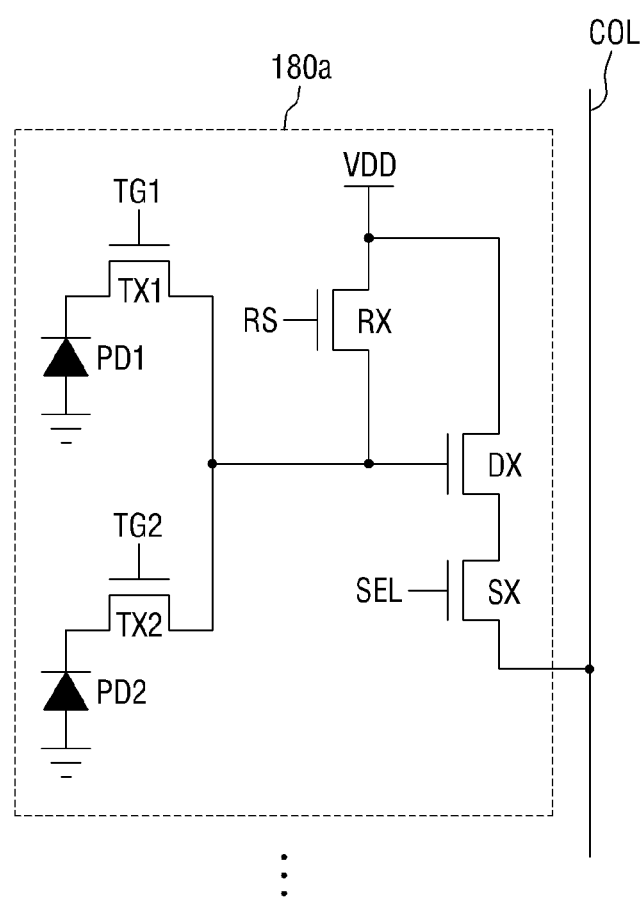
FIGS. 13A and 13B are circuit diagrams of shared active pixels included in image sensors according to other embodiments.
Figure 13B:
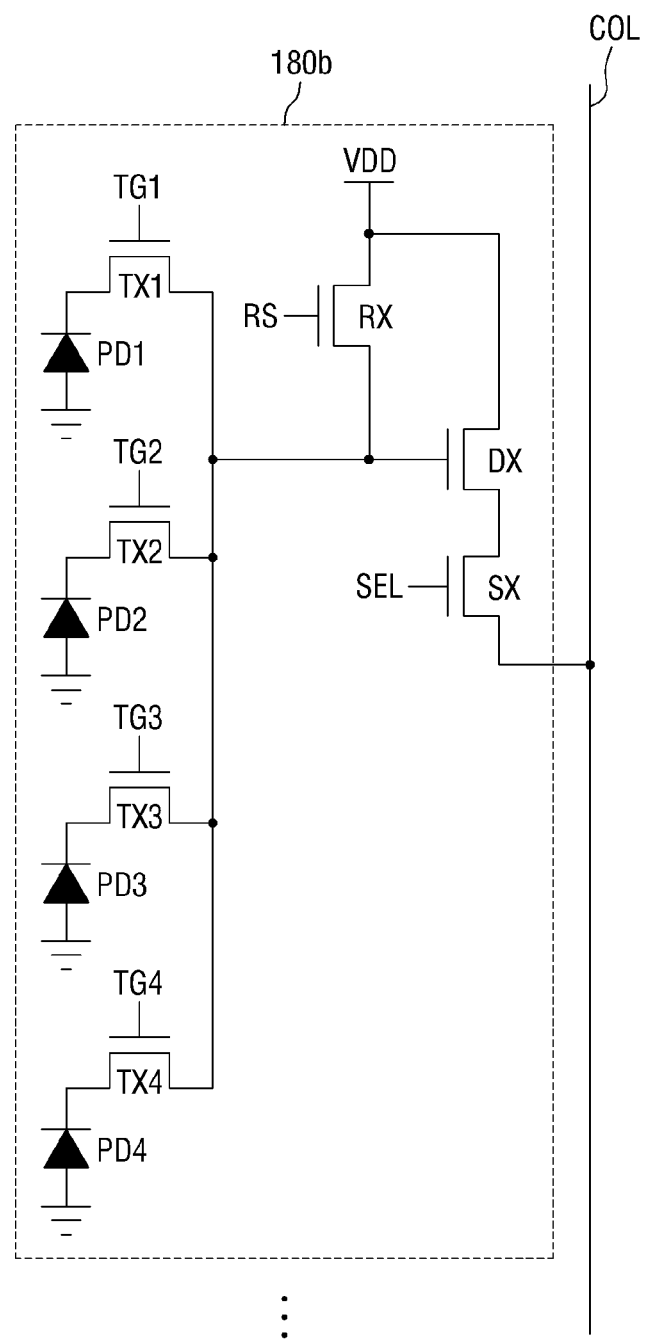

FIGS. 13A and 13B are circuit diagrams of shared active pixels included in image sensors according to other embodiments.

Referring to FIG. 13A, the image sensor includes a shared active pixel 180a in which two active pixels share a reset transistor RX, a drive transistor DX, and a selection transistor SX. Since the two active pixels share the transistors RX, DX and SX, the proportion of an area occupied by a photodiode PD increases, thereby increasing a fill factor of the image sensor.

In the shared active pixel 180a, the two active pixels disposed in two different rows share part of a circuit. Therefore, the two rows may operate sequentially or separately at different times, instead of simultaneously.

Referring to FIG. 13B, the image sensor includes a shared active pixel 180b in which four active pixels share a reset transistor RX, a drive transistor DX, and a selection transistor SX. Since the four active pixels share the transistors RX, DX and SX, the proportion of an area occupied by a photodiode PD increases, thereby increasing a fill factor of the image sensor. Even if the four active pixels share the transistors RX, DX and SX, they can operate independently through timing control.

In FIGS. 13A and 13B, two active pixels and four active pixels share the transistors RX, DX and SX. However, depending on various embodiments, three active pixels or five or more active pixels may share at least one transistor.

Figure 14:
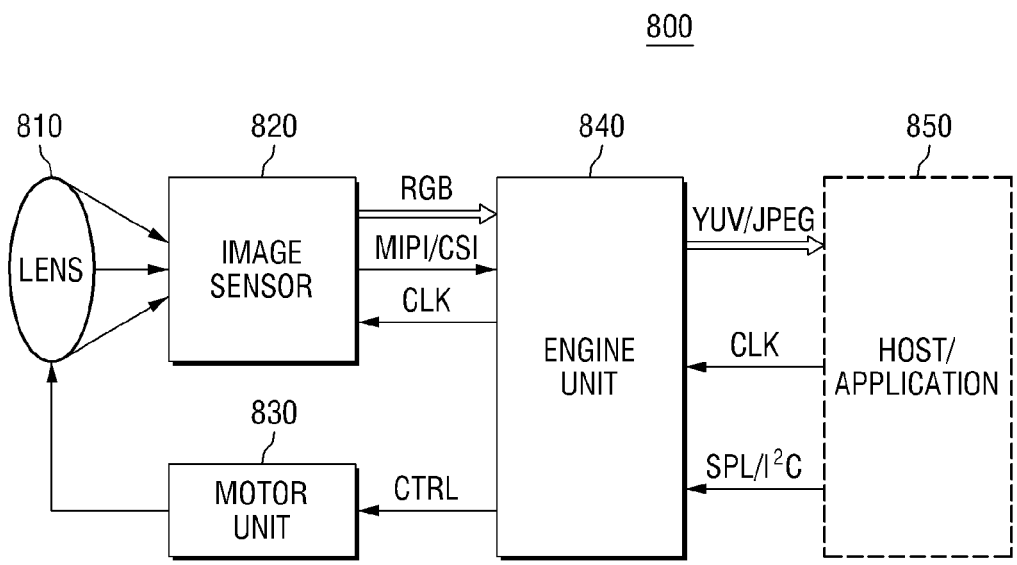
FIG. 14 is a block diagram of an example of a digital camera using an image sensor according to the exemplary embodiments.

FIG. 14 is a block diagram of an example of a digital camera 800 using an image sensor according to the exemplary embodiments.

Referring to FIG. 14, the digital camera 800 may include a lens 810, an image sensor 820, a motor unit 830, and an engine unit 840. The image sensor 820 uses an offset-compensated reference voltage as a reference voltage for analog-to-digital conversion.

The lens 810 focuses incident light onto a light receiving region of the image sensor 820. The image sensor 820 may generate RGB data in a Bayer pattern based on the light received through the lens 810. The image sensor 820 may provide the RGB data in response to a clock signal CLK.

In other embodiments, the image sensor 820 may interface with the engine unit 840 using a mobile industry processor interface (MIPI) and/or a camera serial interface (CSI).

The motor unit 830 may adjust the focus of the lens 810 in response to a control signal CTRL received from the engine unit 840 or perform shuttering. The engine unit 840 controls the image sensor 820 and the motor unit 830. In addition, the engine unit 840 may generate YUV data including a luminance component, a difference between the luminance component and a blue component, and a difference between the luminance component and a red component based on the RGB data received from the image sensor 820 or generate compressed data, e.g., Joint Photography Experts Group (JPEG) data.

The engine unit 840 may be connected to a host/application 850 and may provide the YUV data or the JPEG data to the host/application 850 based on a master clock MCLK. In addition, the engine unit 840 may interface with the host/application 850 using a serial peripheral interface (SPI) and/or an inter-integrated circuit ($I^2C$).

Figure 15:
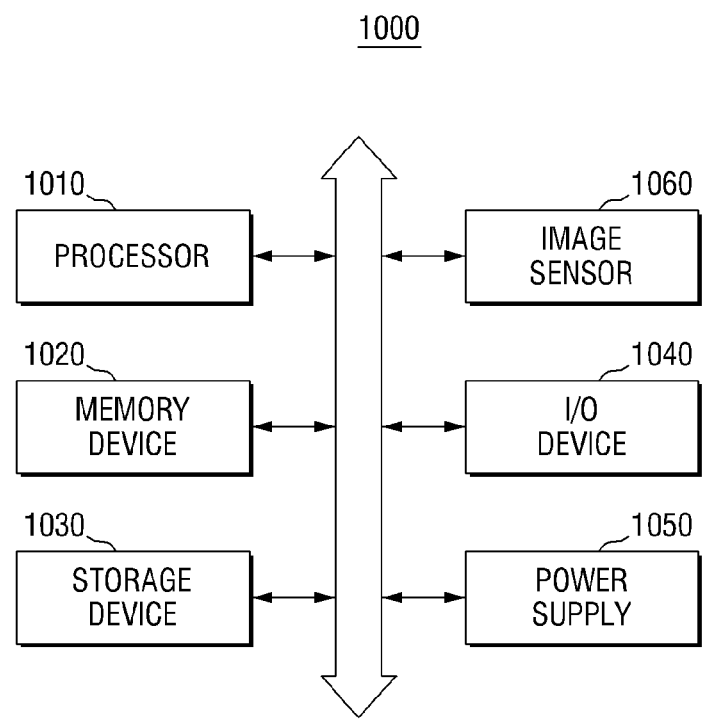
FIG. 15 is a block diagram of an example of a computing system using an image sensor according to the exemplary embodiments.

FIG. 15 is a block diagram of an example of a computing system 1000 using an image sensor according to the exemplary embodiments.

Referring to FIG. 15, the computing system 1000 may include a processor 1010, a memory device 1020, a storage device 1030, an input/output (I/O) device 1040, a power supply 1050, and an image sensor 1060.

As described above, the image sensor 1060 uses an offset-compensated reference voltage as a reference voltage for analog-to-digital conversion. The computing system 1000 in FIG. 15 may further include ports that can communicate with a video card, a sound card, a memory card, a USB device, or other electronic devices.

The processor 1010 may perform various calculations or tasks. According to embodiments, the processor 1010 may be a microprocessor or a central processing unit (CPU).

The processor 1010 may communicate with the memory device 1020, the storage device 1030, and the input/output device 1040 via an address bus, a control bus, and a data bus.

In some embodiments, the processor 1010 may be coupled to an extended bus, such as a peripheral component interconnection (PCI) bus. The memory device 1020 may store data for operating the computing system 1000.

For example, the memory device 1020 may be implemented as a dynamic random access memory (DRAM), a mobile DRAM, a static random access memory (SRAM), a phase random access memory (PRAM), a ferroelectric random access memory (FRAM), a resistive random access memory (RRAM), and/or a magnetic random access memory (MRAM). The storage device 1030 may include a solid state drive (SSD), a hard disk drive (HDD), a CD-ROM, etc.

The input/output device 1060 may include an input device (e.g., a keyboard, a keypad, a mouse, etc.) and an output device (e.g., a printer, a display device, etc.). The power supply 1050 may supply an operating voltage required for the operation of the computing system 1000.

The image sensor 1060 may communicate with the processor 1010 via buses or other communication links. As described above, the image sensor 1060 may generate precise image data by compensating for an offset of the reference voltage. The image sensor 1060 and the processor 1010 may be integrated together into a single chip or may be integrated separately into different chips, respectively.

The computing system 1000 may be any type of computing system using an image sensor. For example, the computing system 1000 may be a digital camera, a mobile phone, a personal digital assistant (PDA), a portable multimedia player (PMP), a smart phone, or a table PC.

Figure 16:
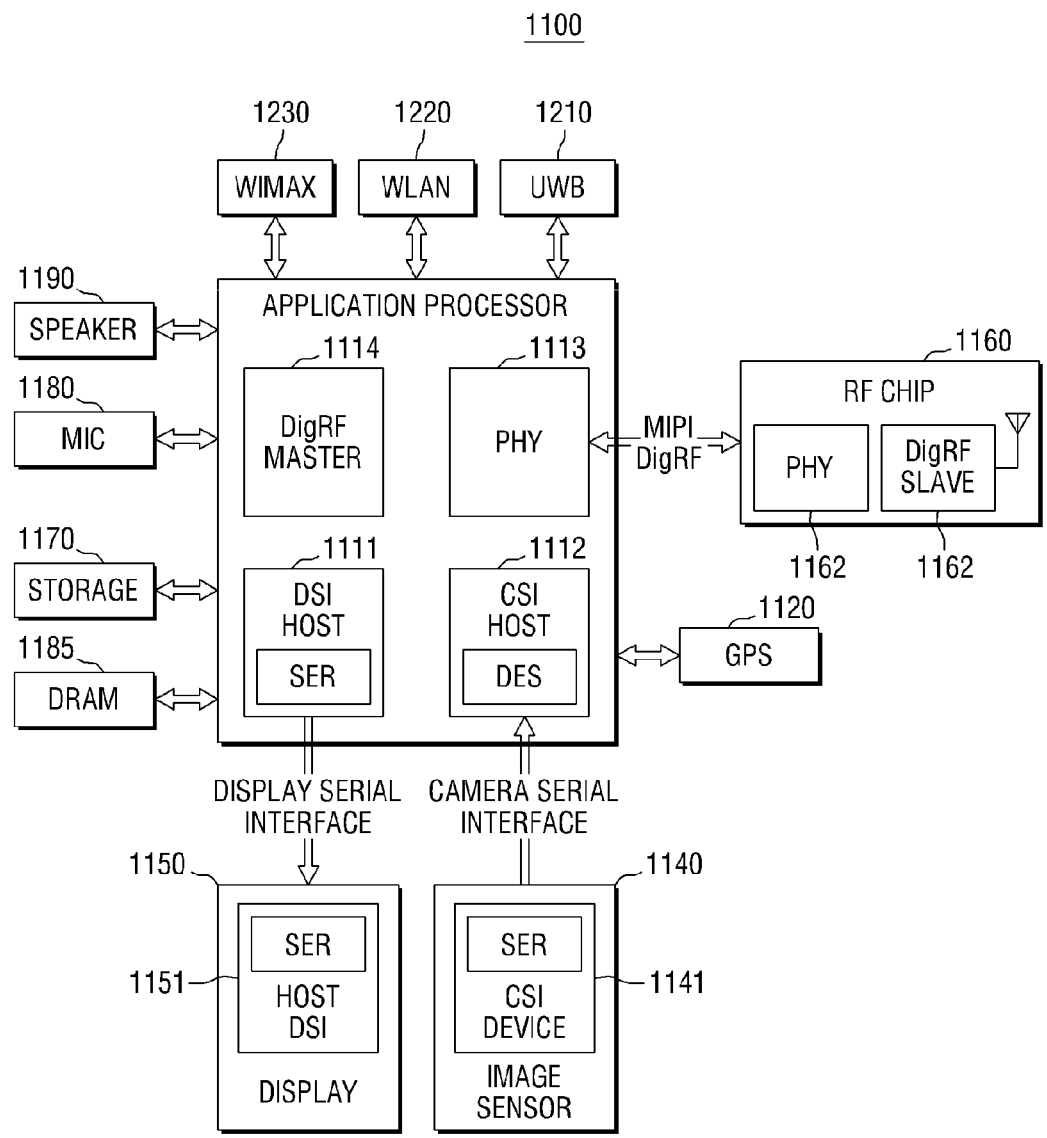
FIG. 16 is a block diagram illustrating an example of interfaces used in the computing system of FIG. 15.

FIG. 16 is a block diagram illustrating an example of interfaces used in the computing system of FIG. 15.

Referring to FIG. 16, the computing system 1100 may be implemented as a data processing device that uses or supports a MIPI interface. The computing system 1100 may include an application processor 1110, an image sensor 1140, and a display 1150.

A CSI host 1112 of the application processor 1110 may perform a serial communication with a CSI device 1141 of the image sensor 1140 via a camera serial interface (CSI). In an embodiment, the CSI host 1112 may include a deserializer (DES), and the CSI device 1141 may include a serializer (SER). A display serial interface (DSI) host 1111 of the application processor 1110 may perform a serial communication with a DSI device 1151 of the display device 1150 via a DSI. In an embodiment, the DSI host 1111 may include an SER, and the DSI device 1151 may include a DES. The computing system 1100 may further include a radio frequency (RF) chip 1160 which can communicate with the application processor 1110. A physical layer (PHY) 1113 of the computing system 1100 and a PHY 1161 of the RF chip 1160 may perform data communications based on a MIPI DigRF.

The application processor 1110 may further include a DigRF MASTER 1114 that controls the data communications of the PHY 1161 based on the MIPI DigRF. The computing system 1100 may further include a global positioning system (GPS) 1120, a storage 1170, a microphone 1180, a DRAM 1185, and a speaker 1190. In addition, the computing system 1100 may perform communications using an ultra wideband (UWB) 1210, a wireless local area network (WLAN) 1220, a worldwide interoperability for microwave access (WIMAX) 1230, etc. However, the above structure and interfaces of the computing system 1100 are merely an example, and the exemplary embodiments are not limited to this example.

Moreover, those skilled in the art will appreciate that many variations and modifications can be made to the preferred embodiments without substantially departing from the principles of the exemplary embodiments. Therefore, the disclosed preferred embodiments of the exemplary embodiments are used in a generic and descriptive sense only and not for purposes of limitation.

What is claimed is:

1. An image sensor comprising:
   n optical black pixels which are arranged in the same horizontal line; and
   m comparators which are matched with the n optical black pixels,
   wherein n is a natural number greater than or equal to 2, and m is a natural number greater than n, and
   wherein at least one of the m comparators is arranged in a vertical line in which a dummy pixel is disposed, the dummy pixel being adjacent to the n optical black pixels and not overlapping with the n optical black pixels.

2. The image sensor of claim 1, wherein n comparators among the m comparators are arranged in respective vertical lines in which the n optical black pixels are respectively disposed, and remaining comparators among the m comparators are arranged in different vertical lines.

3. The image sensor of claim 2, wherein at least one of the remaining comparators among the m comparators is arranged in the same corresponding vertical line as at least one of a plurality of dummy pixels.

4. The image sensor of claim 3, wherein the dummy pixels comprise at least one of a plurality of margin pixels, a plurality of drain pixels, and a plurality of edge pixels.

5. The image sensor of claim 1, wherein at least one of the n optical black pixels is matched with a plurality of comparators of the m comparators.

6. The image sensor of claim 1, wherein the n optical black pixels are divided into x optical black groups, the m comparators are divided into x comparator groups, and the x optical black groups are respectively matched with the x comparator groups, wherein x is a natural number greater than or equal to 2.

7. The image sensor of claim 1, wherein n optical black signals output from the n optical black pixels are merged into one integrated signal, and the one integrated signal is provided to the m comparators.

8. The image sensor of claim 1, wherein y optical black pixels among the n optical black pixels are respectively matched with y comparators, and remaining optical black pixels among the n optical black pixels are each matched with a plurality of remaining comparators among the m comparators, wherein y is a natural number smaller than n.

9. The image sensor of claim 1, further comprising:
   at least one dummy pixel that is arranged in the same vertical line as a first optical black pixel of the n optical black pixels, wherein an output value of the first optical black pixel and at least one output value of the at least one dummy pixel is provided to the same column line.

10. The image sensor of claim 1, further comprising:
    an active pixel which is disposed in the same horizontal line as the n optical black pixels,
    wherein the active pixel is matched with a plurality of comparators.

11. An image sensor comprising:
    a plurality of optical black pixels which are arranged in the same horizontal line and which output a plurality of respective optical black signals to a plurality of column lines;
    a connecting structure which is configured to merge the optical black signals into one integrated signal; and
    a plurality of comparators, wherein each of the comparators is configured to receive the one integrated signal and compare the one integrated signal with a reference signal.

12. The image sensor of claim 11, wherein a number of the optical black pixels is different from a number of the comparators.

13. The image sensor of claim 12, wherein the number of the optical black pixels is smaller than the number of the comparators.

14. The image sensor of claim 11, wherein at least one of the comparators is arranged in the same vertical lines as the optical black pixels, and other comparators besides the at least one of the comparators are arranged in different vertical lines from the optical black pixels,
    wherein the other comparators besides the at least one of the comparators are arranged in the same vertical lines as a plurality of dummy pixels which are adjacent to the optical black pixels,
    wherein the dummy pixels comprise at least one of a plurality of margin pixels, a plurality of drain pixels, and a plurality of edge pixels.

* * * * *